United States Patent [19]

Cook, Jr.

[11] Patent Number: 4,873,693
[45] Date of Patent: Oct. 10, 1989

[54] APPARATUS AND METHOD FOR SUPPRESSING DIFFRACTION RINGS IN A LASER

[75] Inventor: Benjamin H. Cook, Jr., Fallbrook, Calif.

[73] Assignee: Melles Griot San Marcos Company, Carlsbad, Calif.

[21] Appl. No.: 277,883

[22] Filed: Nov. 30, 1988

Related U.S. Application Data

[62] Division of Ser. No. 108,550, Oct. 14, 1987, Pat. No. 4,827,484.

[51] Int. Cl.⁴ ................................................ H01S 3/00
[52] U.S. Cl. ......................................... 372/33; 372/61; 372/60; 445/28
[58] Field of Search .................... 372/33, 60, 61, 92

[56] References Cited

U.S. PATENT DOCUMENTS

| | | |
|---|---|---|
| 2,802,400 | 4/1974 | Steffen . |
| 3,699,471 | 10/1972 | Mulready et al. . |
| 4,207,154 | 6/1980 | Lemelson ........................ 204/157.41 |
| 4,367,130 | 1/1983 | Lemelson ........................ 204/157.61 |
| 4,589,114 | 5/1986 | Sutter .................................... 372/61 |
| 4,649,545 | 3/1987 | Lee et al. ............................. 372/61 |
| 4,788,686 | 11/1988 | Mentel ................................. 372/61 |

Primary Examiner—Léon Scott, Jr.
Attorney, Agent, or Firm—Knobbe, Martens, Olson & Bear

[57] ABSTRACT

A laser comprises an interaction region formed by a wall surface of a capillary discharge tube which has been roughened along a continuous length thereof. This roughened surface suppresses and substantially eliminates diffraction rings in lasers.

2 Claims, 2 Drawing Sheets

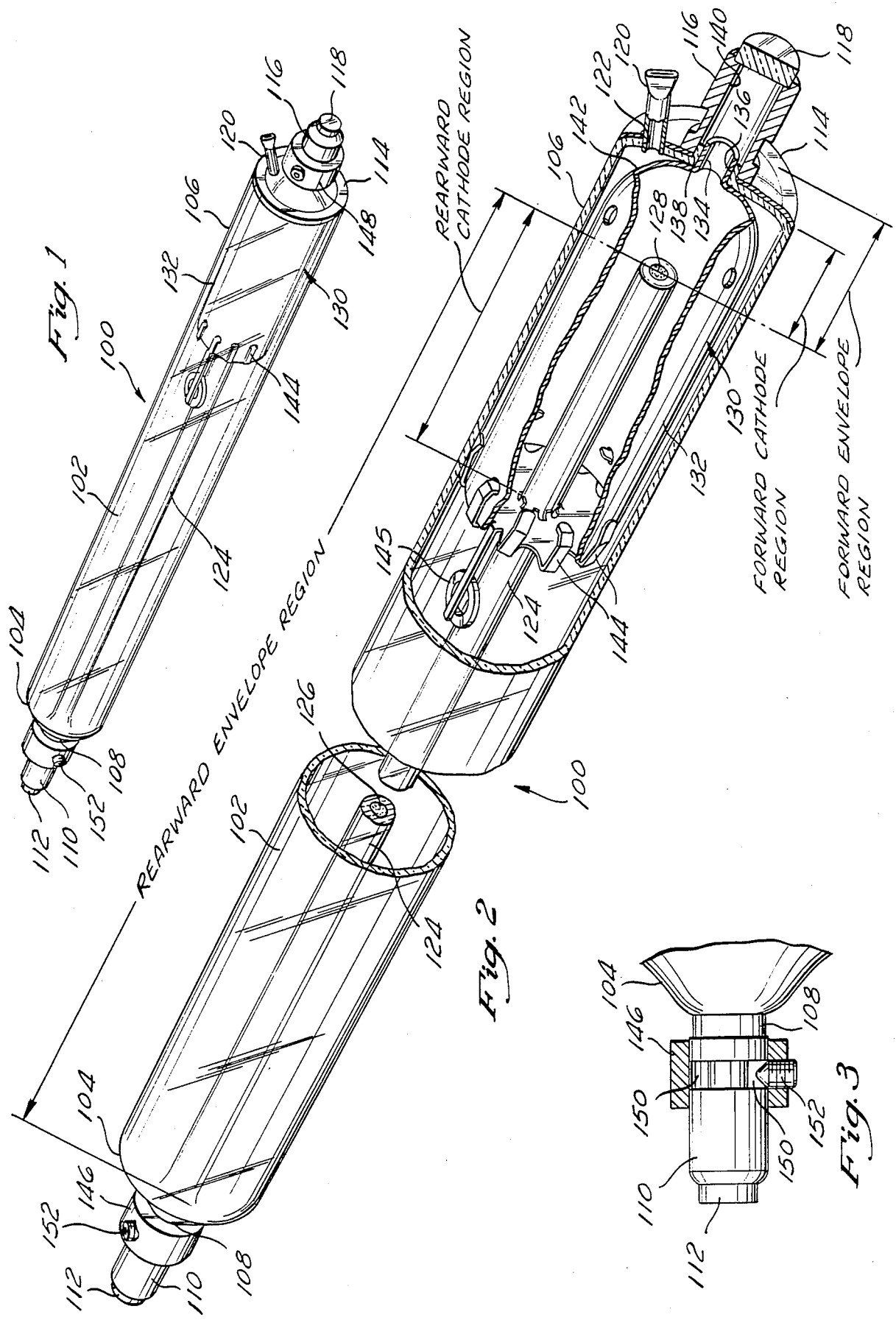

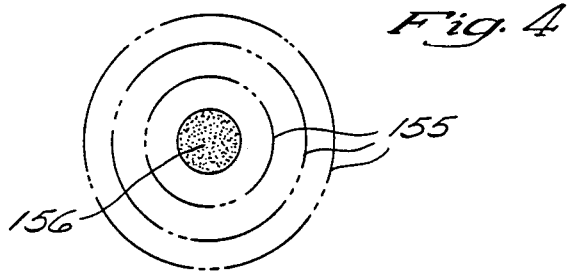
Fig. 4
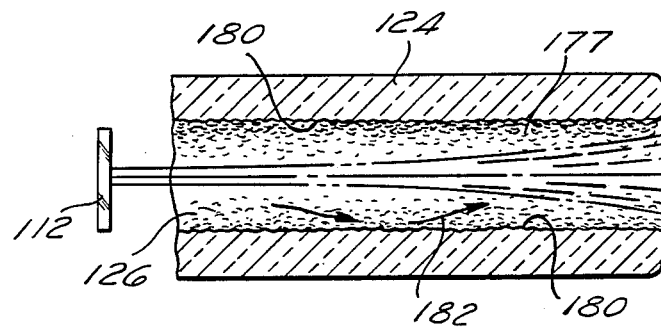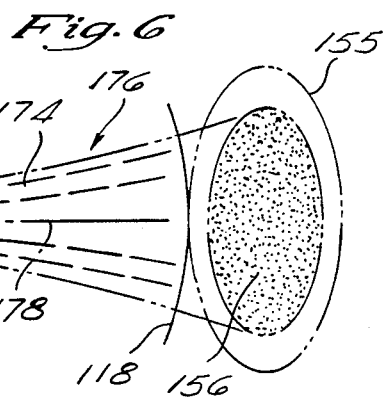
Fig. 6
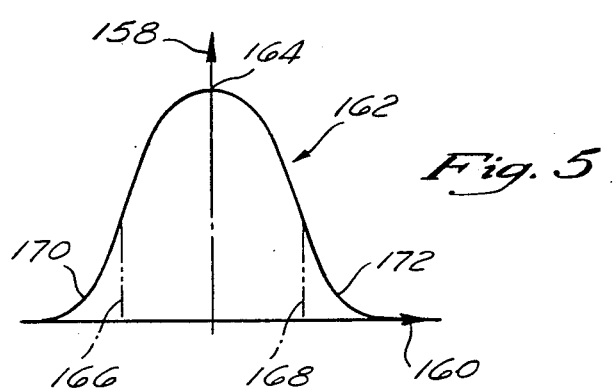
Fig. 5
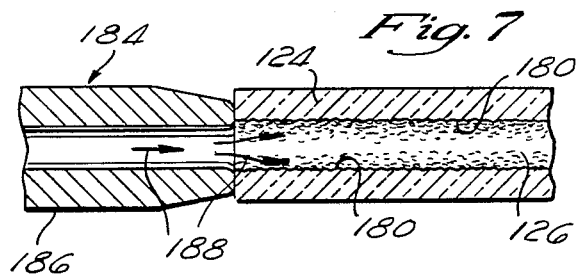
Fig. 7
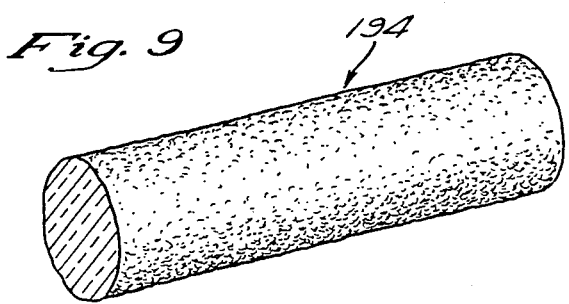
Fig. 9
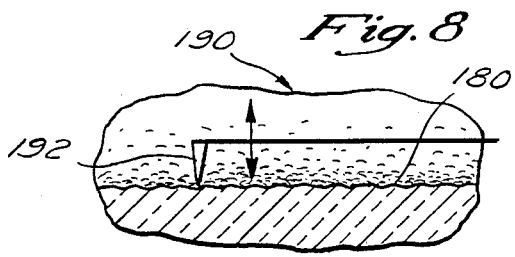
Fig. 8

APPARATUS AND METHOD FOR SUPPRESSING DIFFRACTION RINGS IN A LASER

This application is a continuation, of application Ser. No. 108,550, filed 10/14/87 now U.S. Pat. No. 4,827,484.

BACKGROUND OF THE INVENTION

The invention relates to lasers and, particularly, to an apparatus and method for suppressing diffraction rings in lasers.

Presently available commercial lasers produce undesirable rings of light in their output beams. These rings are commonly referred to as "diffraction rings" and appear as halos of light forming concentric circles about the central laser spot. When lasers are used as optical scanners, e.g., UPC bar code readers, it is important to have as sharp a beam as possible. Diffraction at the output can be construed as multiple beams and may result in false readings.

SUMMARY OF THE INVENTION

The present invention comprises a laser for producing an output beam of optical radiation. The laser includes a pair of reflectors which form an optical cavity having an optical path for propagating light within the optical cavity. A laser medium is provided within the resonant cavity for amplification of the light propagating along the optical path by stimulated emission of photons through an interaction region. The interaction region is bounded by a surface which extends longitudinally along the optical path, such that the longitudinal axes of the interaction region and the optical path are substantially coincident. In the embodiment disclosed, the surface of the interaction region is roughened along a continuous length thereof. Such roughening inhibits the reflection of the light from the surface, such that the diffraction rings in the output beam are substantially eliminated.

In the preferred embodiment, the laser of the present invention comprises an elongate tubular envelope for containing a laser gas. The laser also includes an anode and a cathode, both of which are disposed in communication with the laser gas. A discharge current is generated in the laser gas by applying a potential difference between the anode and cathode, for example, by means of a DC power supply.

The cathode is tubular and includes a forward cathode region and a rearward cathode region. In the rearward cathode region, the cathode is preferably cylindrical and has a substantially uniform diameter. In the forward cathode region, the cathode has a generally hemispherical configuration.

A capillary discharge tube is disposed within the envelope. The tube includes a bore for providing a path for conducting discharge current from the anode. This tube has a first opening adjacent the anode for placing the bore in communication with the anode, and additionally has a second opening for discharging current from the bore to the cathode along a bore to discharge path. In the preferred embodiment, the bore is roughened by means of a sandblasting unit.

The roughened bore substantially eliminates diffraction rings in the laser output. As mentioned above, diffraction rings are halos of light which form concentric circles around the central laser beam spot. It has been found that these rings are the result of stray light particles reflecting off the interior surface of the capillary discharge tube and interfering with the mainstream of light.

By roughening the interior surface of the capillary discharge tube, light incident thereon tends to scatter rather than reflect. This scattering of the light particles lessens the amount of interference with the main beam, and thus the diffraction ring problem is substantially eliminated.

As the roughness of the bore increases, the diffraction ring intensity decreases. To achieve significant reduction in diffraction ring intensity, the average surface roughness should be one micron or more. However, it is preferable that the average bore roughness be more than four microns, and in the preferred embodiment, such roughness is 4.640 microns.

The laser of the preferred embodiment utilizes helium neon gas and may be adapted to operate at various wavelengths. The concepts underlying the present invention are widely applicable to any laser having diffraction ring problems, including solid lasers, and other types of gas lasers.

BRIEF DESCRIPTION OF THE DRAWINGS

FIG. 1 is a perspective view of the laser of the preferred embodiment;

FIG. 2 is a perspective view of the laser of FIG. 1, with a portion of the envelope and cathode cut away to illustrate the mounting arrangement of the capillary discharge tube;

FIG. 3 is an elevational view, in partial cross-section, of the anode end portion of the envelope, illustrating the mirror alignment collar utilized at both the anode and cathode ends of the laser for selectively deforming the mirror mount to adjust the orientation of the mirrors for reflecting light therebetween to form the optical cavity of the laser;

FIG. 4 is a schematic drawing illustrating an output laser beam with a typical diffraction ring pattern;

FIG. 5 is a graph showing the energy distribution pattern for the first order mode of the laser;

FIG. 6 is a schematic representation of the laser of the present invention in operation, showing the main beam of light and stray rays which reflect off the surface of the bore within the capillary discharge tube and interfere with the main beam;

FIG. 7 is a schematic drawing illustrating the use of a sandblasting unit to roughen the bore of the capillary discharge tube;

FIG. 8 is a schematic drawing illustrating the use of a contact profilometer to measure the average bore roughness over a continuous length within the capillary discharge tube; and FIG. 9 is a schematic representation of a rod of solid laser material such as YAG, in which the exterior surface of the laser rod has been roughened to substantially eliminate diffraction rings.

DETAILED DESCRIPTION OF THE PREFERRED EMBODIMENT

The laser 100 of the preferred embodiment comprises a gas laser having a 5 milliwatt output. As shown in FIG. 1, the laser 100 comprises an elongate tubular envelope 102 having an anode end portion 104 and a cathode end portion 106. The envelope 102 is cylindrical and is formed of an insulating material, such as silica glass. In the preferred embodiment, the envelope 102 is on the order of about a foot in length.

Referring to FIGS. 1 and 2, an anode 108 is sealed to the anode end 104 of the envelope 102. The anode 108 is electrically connected and sealed to a mirror mount 110. A planar mirror 112 is mounted on and sealed to the mirror mount 110, e.g., by means of a solder glass. The cathode end 106 portion of the envelope 102 is sealed to an end plate 114 which, in turn, is electrically connected and sealed to a mirror mount 116. A spherical mirror 118 is mounted on and sealed to the mirror mount 116, e.g., by means of a solder glass. The mirrors 112, 118, mirror mounts 110, 116, anode 108 and end plate 114 cooperate to seal the envelope 102 to provide an enclosed volume for containing a laser gas which, in the preferred embodiment, comprises helium neon gas.

A tube 120 which passes through and is sealed to an aperture 122 in the end plate 114 is provided for the purposes of evacuating air from the envelope 102 and filling the envelope 102 with the helium neon gas. Once the envelope 102 has been filled with the laser gas, the tube 120 is closed, e.g., by crimping.

In the embodiment disclosed, the helium neon gas is comprised of $He^3$, $Ne^{20}$ and $Ne^{22}$ in a 17-to-1-to-1 ratio of helium to neon. Those skilled in the art will understand that other gas mixtures may be used alternatively.

An elongate capillary discharge tube 124 is disposed within the envelope 102. This capillary discharge tube 124 has a central longitudinal bore 126 which has a uniform diameter and extends through the entire length of the capillary discharge tube 124. The capillary discharge tube 124 is oriented such that the central longitudinal axis of the bore 126 is coincident with the central longitudinal axis of the envelope 102. At the anode end 104 of the envelope 102, the capillary discharge tube 124 is joined to the envelope 102 portion so that it is cantilever supported thereby. Further, the tube 124 has an opening (not shown) adjacent to the anode 108 so that the laser gas is in communication with the anode 108. This opening is formed by an enlarged diameter tube portion, which is in communication with the bore 126. The capillary discharge tube 124 extends from the anode end 104 towards the cathode end 106, and is formed of a non-metallic, insulating material, such as glass.

At the end of the tube 124, an opening 128 is provided in the bore 126 to allow discharge current from the anode 108 to flow out of the tube 124. In the preferred embodiment, the discharge tube 124 is about 11 inches in length. However, the length may vary depending on factors such as the output power of the laser. For example, in an alternative embodiment, the discharge tube may be about 3-4 inches in length. The bore 126 is sized for single mode operation in the preferred embodiment, and has a diameter of about 1/16 inch.

The laser 100 also includes a tubular cathode 130 at the cathode end 106 of the envelope 102. The cathode 130 is a tubular elongate, cylindrical symmetric structure having a central longitudinal axis which is coincident with the central longitudinal axis of the envelope 102. Those skilled in the art will understand that a cylindrical symmetric structure is a structure in which the radial distance at any point along the longitudinal axis is the same. The cathode 130 in the preferred embodiment includes a cylindrical portion 132 having a uniform diameter selected such that the outer surface of the cylindrical portion 132 is adjacent to the inner surface of the cathode end 106 of the envelope 102 along its length. The cathode 130 also includes a second generally cylindrical portion 134 which has a reduced diameter relative to the first cylindrical portion 132. Preferably, this portion 134 also has a uniform diameter. This cathode portion 134 is sized to fit within a central aperture 136 formed in the end plate 114. The end plate 114 has a flanged portion which forms a collar 138 around the cathode portion 134 to provide good electrical contact therebetween. The flanged collar 138, in turn, fits within a central longitudinal bore 140 in the mirror mount 116 such that the end plate 114 and cathode portion 134 make electrical contact with the mirror mount 116. Interposed between the larger diameter cylindrical portion 132 and the reduced diameter cylindrical cathode portion 134 is a generally hemispherical cathode portion 142 which provides a transition therebetween. The hemispherical portion 142 is disposed such that the center of the hemisphere is located in proximity to the center of the opening 128. The reduced diameter cylindrical portion 134 and the hemispherical cathode portion 142 form a "snout-like," funnel-shaped structure which closes off a substantial portion of one end of the cathode 130.

For the purpose of reference hereinafter, the envelope is divided into a forward envelope region and a rearward envelope region. The forward envelope region comprises the portion of the envelope 102 between the opening 128 in the capillary discharge tube 124 and the cathode end 106. The rearward envelope region comprises the portion of the envelope 102 between the opening 128 and the anode end 104. Thus, the laser 100 may be viewed as being divided into two parts by an imaginary plane normal to the central longitudinal axis, disposed at the opening 128. This plane also divides the cathode 130 into a forward cathode region, disposed in the forward envelope region and a rearward cathode region disposed in the rearward envelope region.

The capillary discharge tube 124 extends into the cathode 130 such that the opening 128 of the bore 126 is disposed substantially at the juncture of the larger diameter cathode portion 132 and the transitional or hemispherical cathode portion 142. Thus, the cathode 130 surrounds the capillary discharge tube 124 exclusively through the length of the large diameter cathode portion 132. Depending on the overall length of the capillary discharge tube 124, it may be preferable to support the capillary discharge tube 124 intermediate its ends, e.g., by means of a spider structure 144, such that the capillary discharge tube 124 extends toward the cathode end 106 from the spider 144 in cantilever fashion. Attached to the spider 144, and extending into the rearward envelope region is a getter 145.

The mirror mount 110 at the anode end 104 of the envelope 102 includes a central longitudinal bore (not shown), similar to the central longitudinal bore 140 of the mirror mount 116 at the cathode end 106. The central longitudinal axes of these bores are coincident with the central longitudinal axis of the envelope 102, so as to form an optical path through the laser 100 between the mirrors 112, 118.

Those skilled in the art will understand that to form an optical cavity, the mirrors 112, 118 must be properly aligned. To facilitate such alignment, the laser 100 of the present invention includes a pair of mirror alignment collars 146, 148. For the purposes of illustration, only the collar 146 on the mirror mount 110 is shown in FIG. 3.

The collar 146 is disposed on the exterior of the mirror mount 110 adjacent an annular slot 150 formed in the exterior surface of the mirror mount 110. The collar 146 includes a series of set screws 152 spaced around the collar 146, e.g., at 120° intervals, such that the set screws 152 may be driven into the annular slot 150. The set screws 152 are slightly larger than the slot 150 and have a conically tapered end. Thus, by driving one of the set screws 152 into the slot 150, the conical end of the set screw 152 will spread the portion of the slot 150 adjacent thereto, while causing corresponding narrowing of the slot 150 on the opposite side thereof. Accordingly, by manipulating selected ones of the set screws 152, the orientation of the mirror 112 may be properly adjusted. Additionally, the use of a plane mirror 112 at the anode end 104 and a spherical concave mirror 118 at the cathode end 106 facilitates the alignment of the mirrors 112, 118, forming the optical cavity in the laser, and provides a very stable arrangement.

The principles of laser operation are well known in the art and thus will be only be briefly described. The laser 100 is energized by applying a potential difference (voltage) between the anode 108 and the cathode 130. Since the anode 108 is electrically connected to the mirror mount 110 and the cathode 130 is electrically connected to the mirror mount 116, the mirror mounts 110, 116 may serve as terminals for application of the potential difference. In the preferred embodiment, the potential difference or voltage is generated by a DC power supply (not shown). Application of such voltage between the anode 108 and the cathode 130 causes ionization of the laser gas within the envelope 102. Accordingly, a discharge current flows from the anode 108 through the bore 126 of the capillary discharge tube 124 to the inner surface of the cathode 130. Conversely, electrons from the cathode material flow through the laser gas to the bore opening 128 and through the bore 126 to the anode 108.

The discharge current excites atoms of laser gas within the bore 126 to a higher energy state in accordance with well known laser principles to provide an active "pumped" gain medium. The excited atoms then relax to a lower energy level, during which time they emit photons (light particles) having a wavelength characteristic of the difference between the energy levels. Although laser gases typically emit such photons at a variety of wavelengths, the laser 100 may be adapted to cause preferential emission at a particular wavelength, for example, 632.8 nm. One common method involves coating the mirrors 112, 118 with a reflective coating which preferentially reflects light at the desired wavelength. The reflected photons cause emission of additional photons at the same wavelength in accordance with a phenomena commonly referred to as "stimulated emission." This causes light of the desired wavelength to preferentially build up in the optical cavity of the laser 100 and thereby stimulates emission from the laser gas at the desired wavelength.

Referring to FIG. 4, the laser output beam forms a central beam spot 156 having a circular cross section. As discussed previously, undesirable diffraction rings 155 can form around the central laser beam spot 156, as illustrated in FIG. 4 by phantom lines.

An energy distribution pattern 162 for the first order, or fundamental mode of the laser, is shown in FIG. 5. A Y-axis 158 represents the intensity of the light, while an X-axis 160 represents the distance from the center of the bore 126. As illustrated, the energy distribution pattern 162 of the fundamental mode is Gaussian shaped, such that most of the light intensity is concentrated at the center 164 of the pattern 162. A central area of the energy distribution curve 162, which corresponds to the bright central output beam spot 156 (FIG. 4) is defined by lines 166, 168. Light outside of these lines 166, 168, referred to herein as tail sections 170, 172, is of a much lesser intensity.

As shown in FIG. 6, when the laser 100 is operating, light propagates in an optical path 174, which extends between the mirrors 112, 118. Because the mirror 112 is planar while the mirror 118 is curved, the light forms a more or less conically shaped optical beam 176 which tends to diverge and converge.

As the light propagates back and forth between the mirrors 112, 118, the light is amplified by stimulated emission. Such stimulated emission occurs in an elongated interaction region 177, which has a longitudinal axis 178, substantially coincident with the optical path 174. This interaction region 177 is bounded on sides thereof by the non-metallic inner walls 180 of the discharge tube 124, and in the embodiment shown, extends the full length of the bore 126. Stated another way, the interaction region 177 includes the entire cylindrical volume within the inner walls 180 of the discharge tube 124, so that the inner wall surface 180 of the discharge tube 124 is thus in communication with the laser gas plasma along the entire length of the interaction region 177. The interaction region 177 thus contains and confines the gas plasma associated with the laser discharge.

As the light particles are reflected between the mirrors 112, 118, most of the light intensity is concentrated about the central axis 178 of the interaction region 177, and this light forms the center spot 156. However, some of the light corresponding to the tail sections 170, 172 on the energy distribution curve 162 will impinge on the bore surface 180, i.e., the inner walls of the capillary discharge tube 124. If the light, incident on the surface 180 of the capillary discharge tube 124, is at an angle known as the "grazing angle," the light will be totally internally reflected. Upon reflection, the reflected light 182 will traverse an optical path which is different from that of the main beam 156. This reflected light 182 can interfere with the main beam 156 of light and results in the diffraction ring pattern 155 seen at the output.

In the laser 100 of the preferred embodiment, the interior surface 180 of the capillary discharge tube 124 is roughened throughout the central longitudinal bore 126 to provide a uniformly textured surface. This roughening the bore 126 of the capillary discharge tube 124, throughout the length of the interaction region 177, tends to scatter the light particles incident thereon, rather than reflect them. By scattering the light particles, less light interferes with the main beam 156; thus the diffraction rings 155, as seen at the output, are greatly reduced in intensity and substantially eliminated.

In the preferred embodiment, the interior surface 180 of the capillary discharge tube 124 is roughened by an abrasive "sandblasting" unit 184, as shown in FIG. 7. By way of example, an AIRBRASIVE UNIT MODEL HME, commercially available from S. S. White Industrial Products, Piscataway, N.J. Prior to final assembly of the laser 100, an output nozzle 186 of the unit 184 is abutted against the anode and end of the capillary discharge tube 124 and the capillary discharge tube 124, in turn, acts as an extension of the nozzle 186. An aluminum oxide grit 188, having a diameter, for example, of 150 $\mu$, is shot into the bore 126 for a predetermined time at a predetermined pressure, for example, at 120 p.s.i. for ten seconds. Preferably, the nozzle 186 should be positioned such that it is longitudinally aligned with the central longitudinal axis of the capillary discharge tube 124 to ensure a substantially uniform roughening throughout the bore 126. Alternatively, the bore 126 can be roughened by using a valve grinding compound and turning the bore 126 on a mandril.

Referring to FIG. 8, a contact profilometer 190 may be used to measure the degree of roughness within the bore 126. As is well known, the profilometer 190 utilizes a stylus 192 in direct contact with the surface 180 of the bore 126. The peaks and valleys on the bore surface 180 are measured over a path of at least 2 mm, and an average bore roughness is calculated. Tests indicate that as the bore texture increases in roughness, the diffraction ring intensity decreases.

It has been determined that, to achieve significant reduction in diffraction ring intensity, the average surface roughness should be one micron or more. However, it is preferable that the average bore roughness be more than 4 microns. In the preferred embodiment, such roughness is 4.640 microns. Additionally, it is preferable that the bore surface 180 be roughened over substantially the entire length of the interaction region 177 to prevent light rays 182 incident on any portion thereof from propagating along the optical path 174 and interfering with light in the main output beam 156.

Although the preferred embodiment utilizes a 5 milliwatt gas laser, it should be recognized that the present invention is applicable to lasers of virtually any power level. Additionally, while the laser 100 described in the preferred embodiment is a HeNe gas laser, the techniques described herein are applicable to any laser having the diffraction ring problem solved by the present invention, for example, solid lasers, and lasers using gases other than HeNe.

FIG. 9 is a schematic representation of a rod 194 of laser material such as YAG. Solid lasers are well known in the art and, like gas lasers, operate on the principle of amplification by stimulated emission. The solid laser rod 194 provides a laser gain medium for the laser and the light propagates longitudinally through the rod 194 between mirrors (not shown). The rod 194 forms an interaction region in which the stimulated emission occurs and this interaction region is bounded by the exterior side surface of the rod. When the techniques of the present invention are applied to solid lasers, the exterior side surface of the laser rod 194 is roughened. In a matter analogous to the gas laser described herein, roughening the exterior surface of the laser rod 194 tends to scatter the light which is incident on the exterior surface of the rod 194 at the grazing angle. This scattering of the light rays reduces interference with the main beam, thereby suppressing diffraction rings.

The present invention thus significantly reduces diffraction rings 155 in the output 156 of the laser beam and provides a new class of lasers having output beams 156 which are significantly sharper than those of presently available lasers.

What is claimed is:

1. A method of manufacturing a gas laser having an envelope for containing a laser gas and a tube in said envelope which surrounds an optical path, said method comprising flowing a substance through said tube to roughen interior surfaces of said tube such that diffraction rings in light output from said laser are suppressed.

2. The method of claim 1, wherein said substance comprises abrasive particles.

* * * * *